(12) United States Patent
Lee

(10) Patent No.: US 7,587,093 B2
(45) Date of Patent: Sep. 8, 2009

(54) METHOD AND APPARATUS FOR IMPLEMENTING DCT/IDCT BASED VIDEO/IMAGE PROCESSING

(75) Inventor: Kun-Bin Lee, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 881 days.

(21) Appl. No.: 10/887,375

(22) Filed: Jul. 7, 2004

(65) Prior Publication Data

US 2006/0008168 A1    Jan. 12, 2006

(51) Int. Cl.
*G06K 9/36* (2006.01)

(52) U.S. Cl. ......................... 382/250; 382/232

(58) Field of Classification Search ................. 382/232, 382/233, 246, 250; 375/240.03
See application file for complete search history.

(56) References Cited

U.S. PATENT DOCUMENTS

| | | | |
|---|---|---|---|
| 5,270,832 A * | 12/1993 | Balkanski et al. ........... | 382/246 |
| 5,341,318 A | 8/1994 | Balkanski et al. | |
| 5,410,352 A * | 4/1995 | Watanabe ............... | 375/240.03 |
| 5,576,958 A | 11/1996 | Kawakatsu et al. | |
| 5,636,152 A | 6/1997 | Yang et al. | |
| 5,883,823 A | 3/1999 | Ding | |
| 6,167,092 A | 12/2000 | Lengwehasatit | |
| 6,421,695 B1 | 7/2002 | Bae et al. | |
| 7,187,802 B2 * | 3/2007 | Ju .............................. | 382/233 |

| | | |
|---|---|---|
| 2003/0227976 A1 | 12/2003 | Okada et al. |

FOREIGN PATENT DOCUMENTS

| | | |
|---|---|---|
| EP | 1416738 A2 | 5/2004 |
| JP | 2000032455 | 1/2000 |
| JP | 2001204044 | 7/2001 |
| TW | 331611 | 11/1993 |
| TW | 395135 B | 6/2000 |
| TW | 490634 B | 6/2002 |

* cited by examiner

*Primary Examiner*—Duy M Dang
(74) *Attorney, Agent, or Firm*—Hoffman Warnick LLC

(57) ABSTRACT

Several apparatuses employing a tag table and/or an AC table, and same method are provided. First, a data access apparatus, which comprises a buffer, a tag table and a controller, receives and outputs a plurality of data with at least two distinct categories in a specified sequence. The buffer stores the data of less than all the specified categories. The tag table keeps records of corresponding category information associated with the data. The data stored in the buffer is further read out under the control of the controller by referencing the corresponding category information in the tag table, so that the data access apparatus outputs the data in the specified sequence correctly. Second, an apparatus, which comprises a tag table, an AC table and a processing circuit, detects high frequency AC coefficients in a digital data processing system. The tag table includes a plurality of tag values corresponding to a plurality of DCT coefficients in an incoming DCT matrix. The AC table includes a plurality of correspondingly predetermined AC state values with at least two distinct states. The processing circuit compares the corresponding pair of the tag and AC state values to determine whether any DCT coefficient of a particular state exists in the incoming matrix.

14 Claims, 10 Drawing Sheets

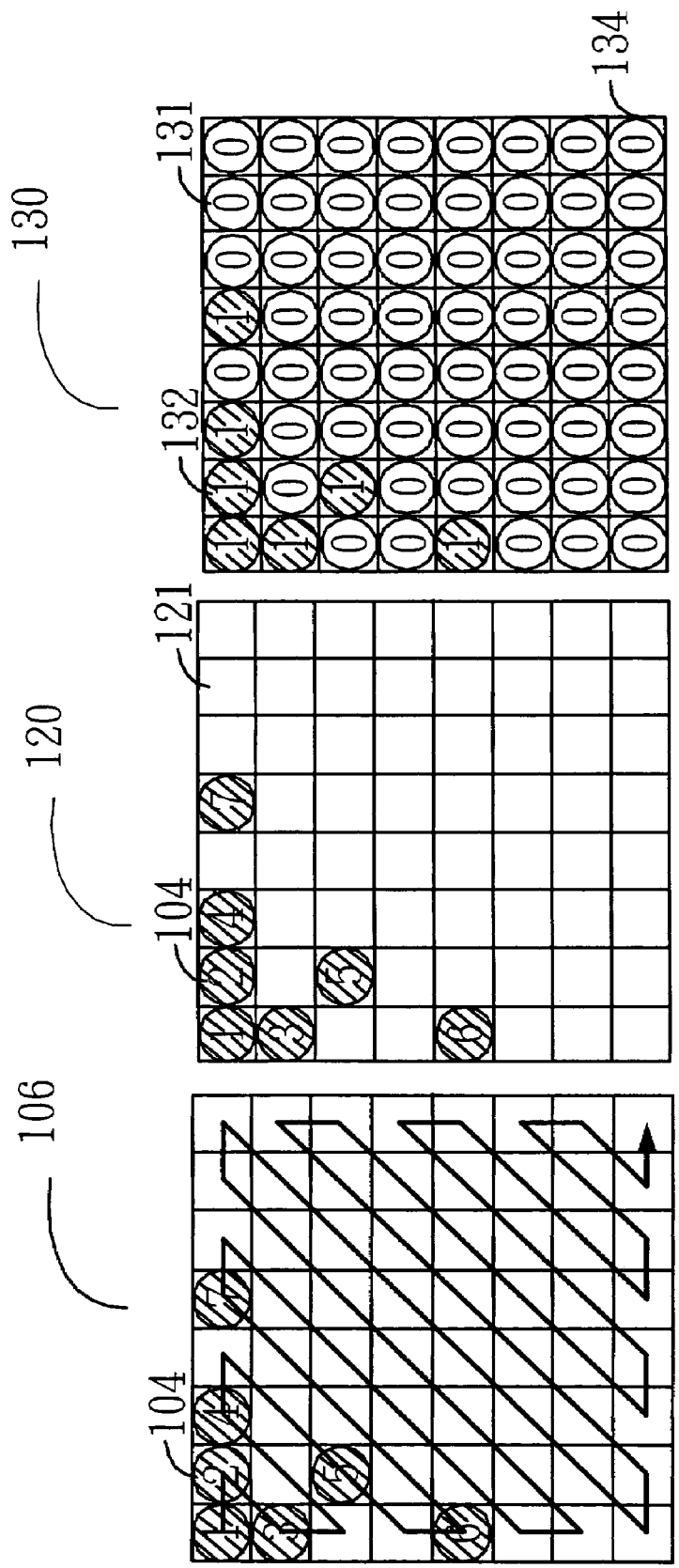

METHOD AND APPARATUS FOR IMPLEMENTING DCT/IDCT BASED VIDEO/IMAGE PROCESSING

BACKGROUND OF THE INVENTION

1. Field of the Invention

The present invention relates to a method and an apparatus for employing a tag table and/or an AC table. More particularly, the present invention relates to a method and an apparatus for implementing DCT/IDCT based video/image processing with an aid of a tag table and/or an AC table.

2. Description of the Prior Art

Traditionally, an IDCT decoding method and apparatus perform IDCT decoding process on every incoming DCT data (or also known as DCT coefficient), without checking the content therein. Therefore, even though there are some meaningful contents in the incoming DCT coefficients, no special treatment is made in a traditional IDCT decoding process. Some proposals and amendments have been made to give special treatment on some identified special DCT coefficients, so that some desired effect is gained, such as to reduce the total amount of DCT/IDCT data calculation. Such proposals can be found in the actual product relating to JPEG or MPEG decoding. For the purpose of reducing data calculation, many fast algorithms have been proposed to reduce the amount of data calculation while decoding a DCT coefficient. However, these proposed algorithms still need to process every incoming DCT coefficient, though the amount of data calculation might be reduced within the decoding process of the to-be-processed DCT coefficient. For example, in U.S. Pat. No. 6,167,092, it is proposed that the position of the last non-zero coefficient is utilized to decide which sets of different length 1-D IDCT are to be processed. In U.S. Pat. No. 5,883,823, all the DCT coefficients are categorized into two groups: the first group comprises low-frequency 4×4 DCT coefficients, and the second group comprises other DCT coefficients. The regional IDCT algorithm is performed on all the DCT coefficients in the first group, whether zero or non-zero. The traditional IDCT algorithm is performed on all the other DCT coefficients in the second group. In these two patents, zero and non-zero DCT coefficients are not treated differently, therefore can benefit no advantage due to this valuable distinguishing.

In U.S. Pat. No. 5,576,958, a judgment is imposed on the input port of 1-D IDCT to see whether the incoming DCT coefficient is zero or non-zero. If it is zero, the normally followed multiplication calculation associated with this coefficient can then be omitted. However, this algorithm judges merely one coefficient in one specific time unit. Though the total amount of data calculation can then be reduced, the time spent in the multiplication calculation pertaining to one non-zero DCT coefficient is not reduced. Directly performing 2-D IDCT process, instead of performing 1-D IDCT process twice separately, U.S. Pat. No. 5,636,152 performs IDCT process only on non-zero coefficients. In this algorithm, it can save both the time spent on zero coefficient calculation and the time spent to judge whether the coefficient is zero or non-zero. However, this algorithm benefits at the expense of employing complex circuit structure, such as N×N accumulator and direct 2-D IDCT circuit, and therefore is deemed to be not cost-effective. U.S. Pat. No. 6,421,695 is similar in one aspect with U.S. Pat. No. 5,636,152: it performs IDCT process only on non-zero coefficients. However, it also differs in another aspect with U.S. Pat. No. 5,636,152: it is based on 1-D IDCT structure. As for the input data order in U.S. Pat. No. 6,421,695, there are two kinds: one is zigzag order, and the other is inverse zigzag order. To put the input data in the first zigzag order, the buffer in the input port can be saved, however, the required transpose memory would be very complex. To put the input data in the second inverse zigzag order, the inverse zigzag scanned non-zero input data is first stored in the buffer of the input port. Then, only the non-zero coefficients are calculated according to the position information of the stored input data in the non-zero feeding unit. To employ this algorithm, a large memory would be required to store the position information. Besides, there are few non-zero coefficients while performing the first 1-D IDCT process, whereas there are many more non-zero coefficients while performing the second 1-D DCT process. Because of the aforementioned reason, the efficiency of this algorithm would largely depend on the volume capacity of the transpose memory and the processing capacity of the second 1-ID DCT process.

Please refer to FIG. 1. FIG. 1 shows the block diagram of the data access apparatus 10 in the prior art. In the prior art data access apparatus 10, it receives the bitstream which comprises the data to be decoded in the following IDCT decoding procedure. The apparatus 10 typically comprises a controller 12, a variable length decoder 14, an inverse scan buffer 16, and an inverse quantization circuit 18. The variable length decoder 14 receives the bitstream 20, decodes the data therein and then generates a run information 11 and a level information 13. The run information 11 and the level information 13 are in fact well understood by persons skilled in the DCT/IDCT art. The inverse scan buffer 16 would store the level information 13 and perform zero padding under the control of the controller 12. The inverse quantization circuit 18, also under the control of the controller 12, then receives the content stored in the inverse scan buffer 16 for performing inverse quantization procedure.

Please refer to FIG. 2A and FIG. 2B. FIG. 2A shows the DCT matrix 30 with a plurality of DCT coefficients 32 in a zig-zag scan sequence in the prior art. FIG. 2B shows the inverse scan buffer 16 with a plurality of entries 17 for storing the DCT coefficients and for zero padding in the prior art. The run information is the number of zeros between the present level information and a preceding level information in, for example, a zig-zag scan sequence. Take FIG. 2A as an example, the run information 11 and the level information 13 generated by the variable length decoder 14 are as follows: (run, level)=(0, 1)→(0, 2)→(0, 3)→(2, 4)→(2, 5)→(1, 6)→(3, 7)→EOB (End of block). Here for illustration purpose, the values of the level information are the same as the serial number of the non-zero DCT coefficients.

The level information 13, namely the non-zero DCT coefficients, are temporarily stored in the inverse scan buffer 16 according to their correspondingly precise position in the incoming DCT matrix 30 in the zig-zag scan sequence. When the variable length decoder 14 performs decoding, the non-zero DCT coefficients are generated accordingly and stored in their due entries or positions. The controller 12 would at the same time fill the empty entries, if any, in the inverse scan buffer 16 in order that the correct zig-zag scan sequence of all the DCT coefficients can be reconstructed in later time. This process is also known as "zero padding". It takes time to perform zero padding in the inverse scan buffer 16. It is particularly time-consuming because the empty entries usually outnumber the occupied entries of non-zero DCT coefficients. Besides, the zero padding is usually performed on every incoming DCT matrix 30. It can be reasonably imagined that the overall data processing time would be longer due to the zero padding process in the apparatus 10. To the worse, all the content, whether non-zero DCT coefficients or later zero-padded entries, temporarily stored in the inverse scan buffer 16 must be sequentially read out to the next stage circuit, for example the inverse quantization circuit 18. It takes longer time to read out all the content stored in the inverse scan buffer 16. It would deteriorate the data processing speed in the apparatus 10 by the extra burden of more accessing times in inverse scan buffer 16. Further, more access times can result in more data read/write errors.

Therefore, the main objective of the present invention is to provide a method and corresponding apparatus for solving the above-mentioned problems, especially with the aids of a tag table. In addition to the aforementioned situation, the tag table can also benefit other applications. Therefore, it is also another objective of the present invention to provide a tag table and/or an AC table to fast assist the determination whether any high frequency DCT coefficient exits in the input DCT block.

SUMMARY OF THE INVENTION

The main objective of the present invention is to provide a method and an apparatus for implementing DCT/IDCT based video/image processing by determining whether the IDCT process is required to be performed on the particular incoming IDCT data or coefficient.

Another objective of the present invention is to provide a DCT implementation method and an apparatus which can be employed in the encoding/decoding of Shape adaptive DCT/IDCT of the new generation.

Another objective of the present invention is to provide a tag table to fast assist the determination whether any high frequency DCT coefficient exits in the DCT block to be decoded.

The present invention discloses several embodiments to teach the utilization of the tag table employed in different circumstances. For example, the tag table can be utilized to reduce the access times of a buffer in a data access apparatus. With the assistance of the tag table, not all the data of all the categories, but the data of less than all the specified categories, have to be stored in the buffer. With the assistance of the tag table, the data access apparatus can still output the data in the specified sequence correctly. For example, the tag table can also be used to detect whether any DCT coefficient of a particular state, especially AC high frequency coefficient, exists in the DCT matrix. If such a case is detected and identified, it can usually reasonably be utilized for the judgment of the existence of an edge in the corresponding image associated with the DCT matrix.

According to an embodiment of the present invention, a data access apparatus for receiving and outputting a plurality of data is disclosed. There are at least two distinct categories in those data which are arranged in a specified sequence. The apparatus comprises a buffer, a tag table and a controller. The buffer receives and temporarily stores the data therein. The tag table keeps record of the corresponding category information associated with the data. The controller controls the data storage in the buffer and the record keeping in the tag table. Particularly, not all categories of the received data have to be stored in the buffer. The data stored in the buffer is further read out under the control of the controller by referencing the corresponding category information in the tag table, so that the data access apparatus outputs the data in the specified sequence correctly.

According to another embodiment of the present invention, an apparatus for AC coefficient detection employed in a digital data processing system, and the same method are disclosed. The apparatus comprises a tag table, an AC table and a processing circuit. The tag table includes a plurality of tag values corresponding to a plurality of DCT coefficients in an incoming matrix. The AC table includes a plurality of correspondingly predetermined AC state values with at least two distinct states, for example digital 0 or 1. Each AC state value therein is assigned to only one of the at least two distinct states, namely digital 0 or 1. The processing circuit receives the tag and AC state values respectively from the tag and AC tables, and performs data processing thereon. The processing circuit compares the corresponding pair of the tag and AC state values to determine whether any DCT coefficient of a particular state, for example the state of digital 1, exists in the incoming matrix. In this way, if there is any so called "high frequency AC coefficient" in the incoming DCT matrix, it can be easily identified.

The advantage and spirit of the invention may be understood by the following recitations together with the appended drawings.

BRIEF DESCRIPTION OF THE APPENDED DRAWINGS

FIG. 4A shows the DCT matrix with a plurality of DCT coefficients in a zig-zag scan sequence.

FIG. 4B shows the inverse scan buffer 120 with a plurality of entries for storing the non-zero DCT coefficients.

FIG. 4C shows the tag table with a plurality of tag values.

DETAILED DESCRIPTION OF THE INVENTION

Figure 1:
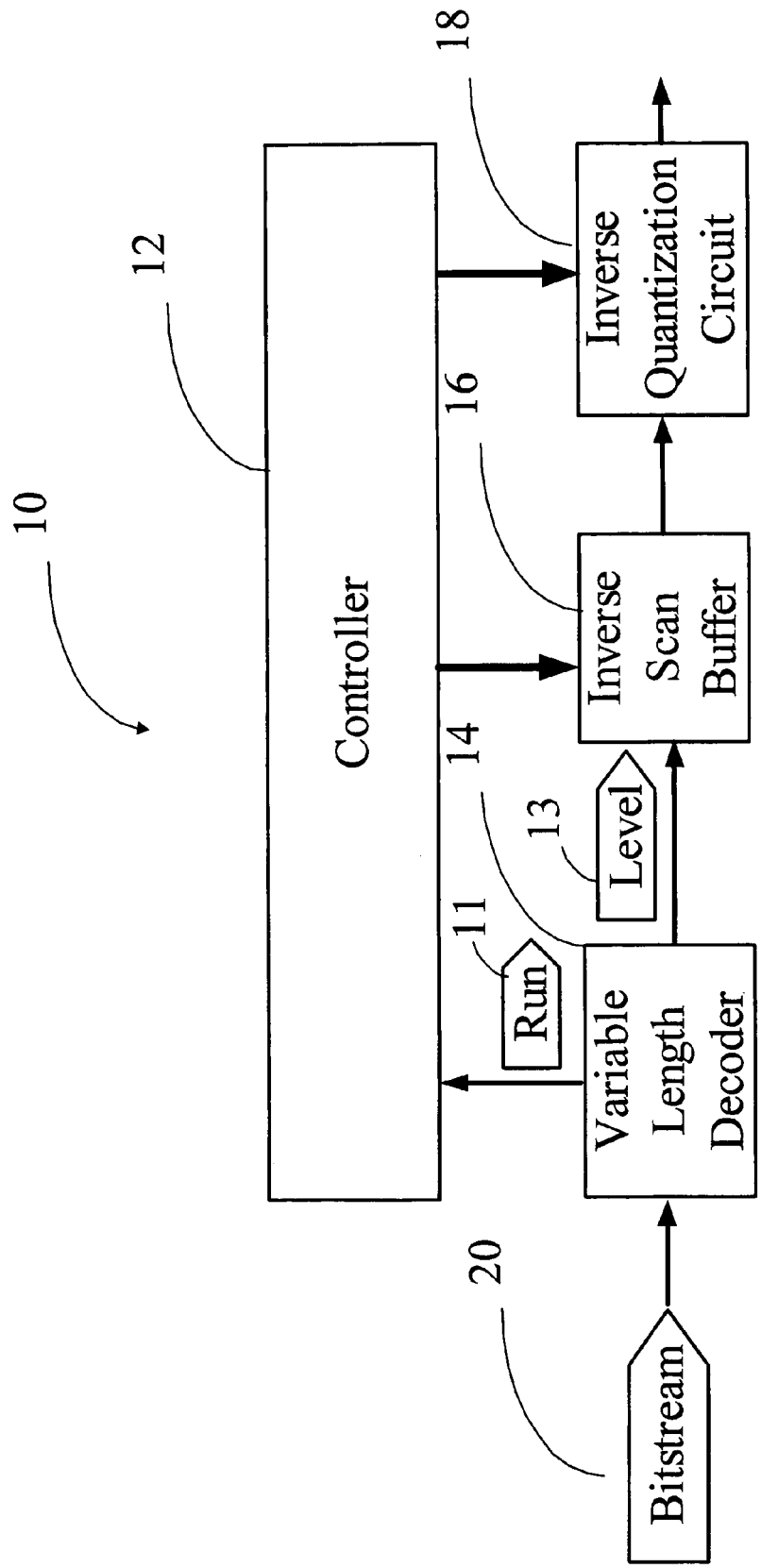
FIG. 1 shows the block diagram of the data access apparatus in the prior art.
Figure 2B:
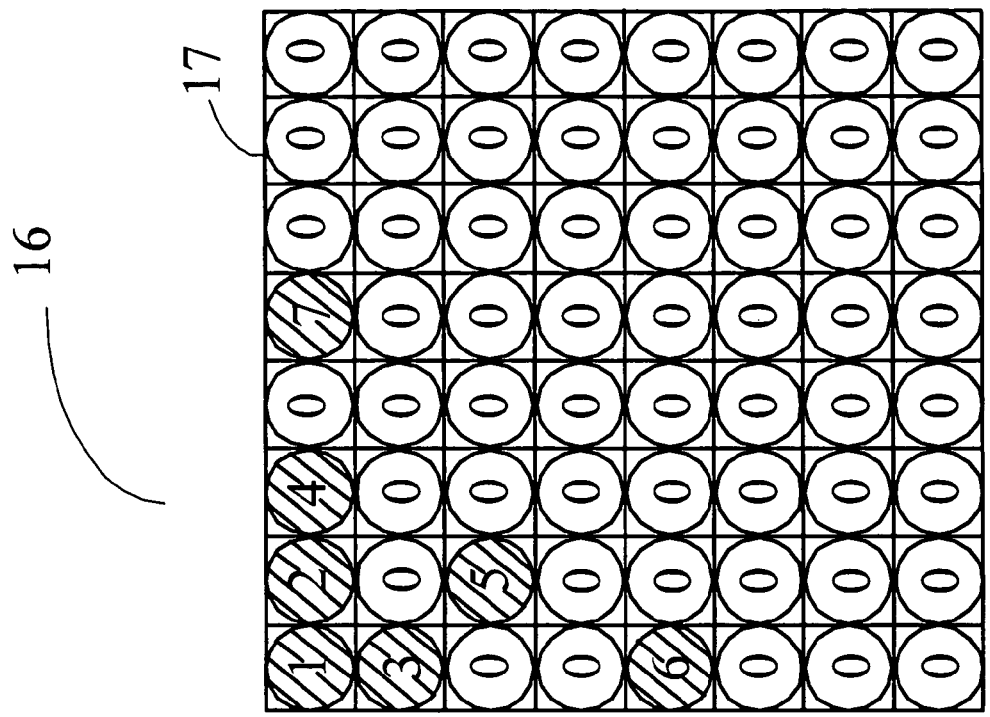
FIG. 2B shows the inverse scan buffer 120 with a plurality of entries for storing the DCT coefficients and for zero padding in the prior art.
Figure 2A:
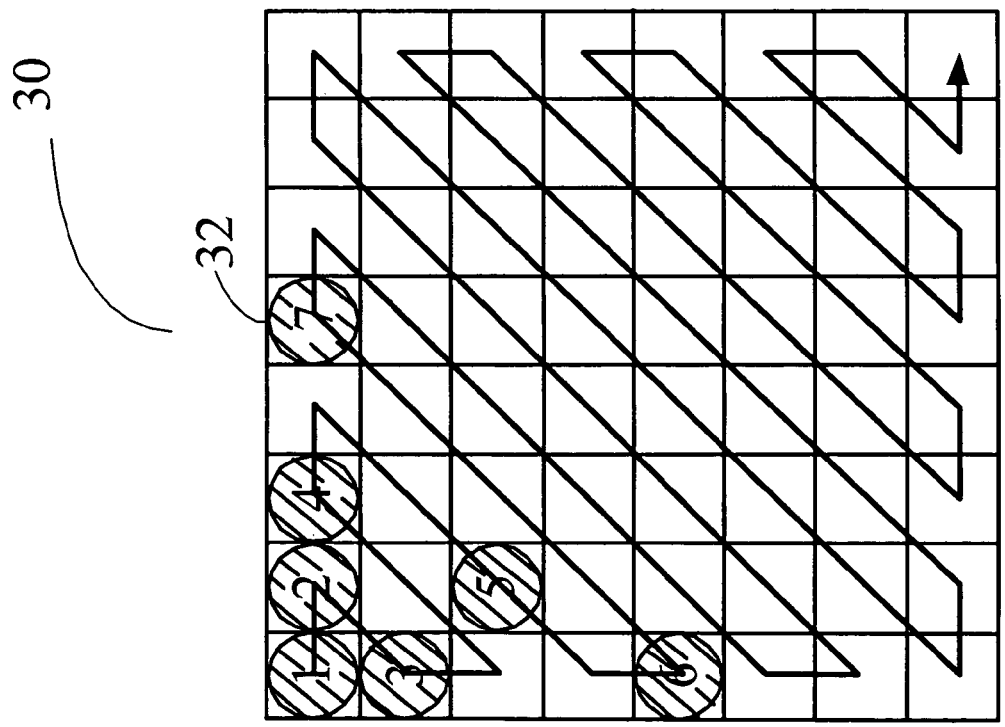
FIG. 2A shows the DCT matrix with a plurality of DCT coefficients in a zig-zag scan sequence in the prior art.
Figure 3:
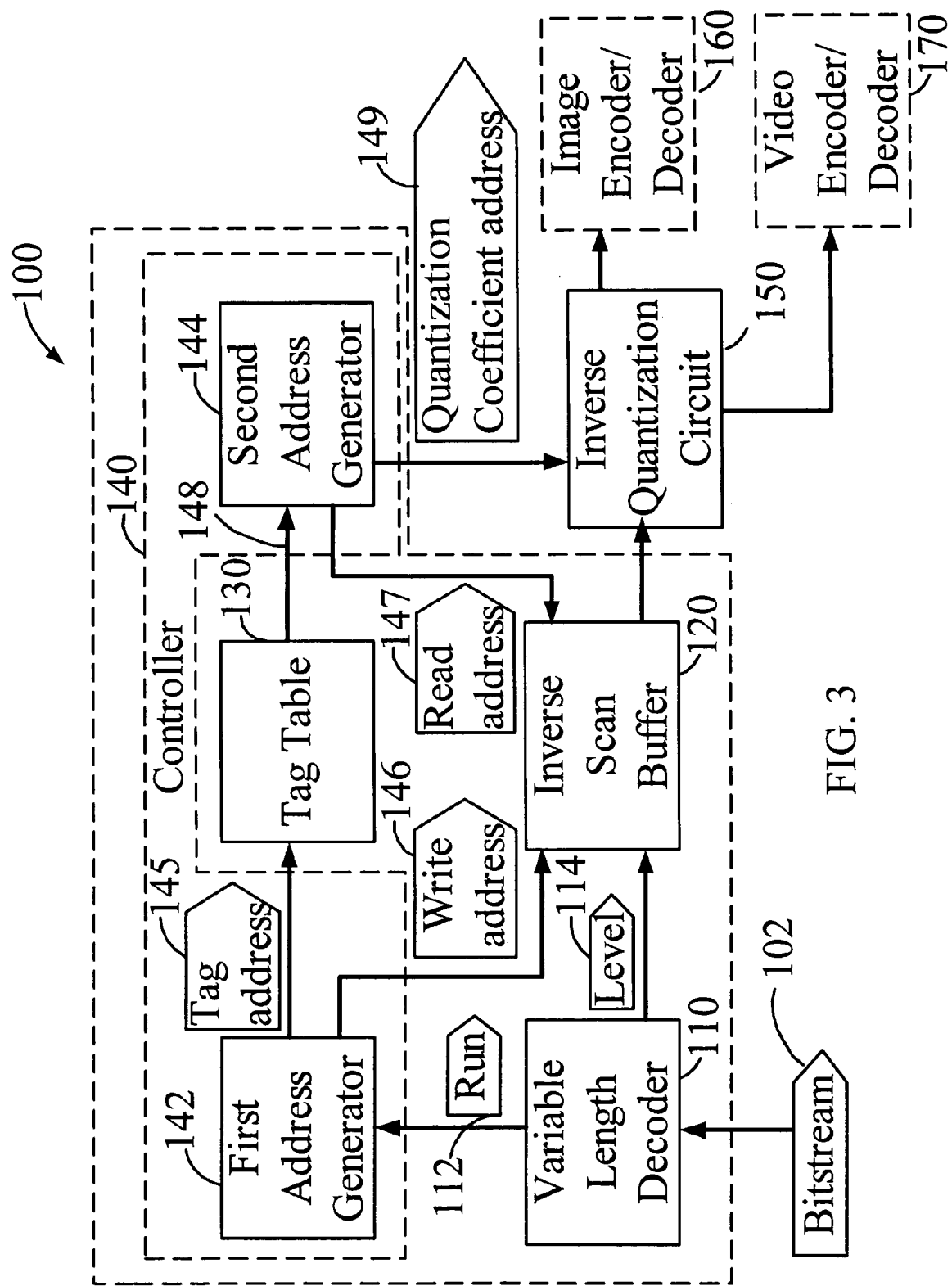
FIG. 3 shows the block diagram of the data access apparatus according to the present invention.

Please refer to FIG. 3, FIG. 4A, FIG. 4B, and FIG. FIG. 3 shows the block diagram of the data access apparatus according to the present invention. FIG. 4A shows the DCT matrix with a plurality of DCT coefficients in a zig-zag scan sequence. FIG. 4B shows the inverse scan buffer 120 with a plurality of entries for storing the non-zero DCT coefficients. FIG. 4C shows the tag table with a plurality of tag values. According to the preferred embodiment of the present invention, the data access apparatus 100 of the present invention receives and outputs a plurality of data 104 which can be properly arranged in the form of a matrix 106. Those data 104 can take a variety of forms in different practical applications, and can be properly classified into at least two, or more, distinct categories. According to the preferred embodiment, the data access apparatus 100 is employed for generating DCT blocks. Each DCT block comprises a plurality of zero and non-zero DCT coefficients in the specified sequence. Those data 104 are usually received and outputted in the zig-zag scan sequence as shown in FIG. 4A. The data access apparatus 100 as shown in FIG. 3 comprises a variable length decoder 110, a buffer 120, a tag table 130, and a controller 140.

The variable length decoder 110 receives the bitstream 102, decodes the data therein and then generates a run information 112 and a level information 114. The run information 112 and the level information 114 are in fact well understood by persons skilled in the DCT/IDCT art. In brief, the level information is a non-zero value for a particular DCT coefficient ranging from $-(2^n) \sim 2^n-1$ except zero. N represents the number of bits allocated for a DCT coefficient. The run information is the number of zeros between the present level information and a preceding level information in the specified sequence, for example the zig-zag scan sequence. Take FIG. 4A as an example, the run information 112 and the level information 114 generated by the variable length decoder 110 are as follows: (run, level)=(0, 1)→(0, 2)→(0, 3)→(2, 4)→(2, 5)→(1, 6)→(3, 7)→EOB (End of block). Here for illustration purpose, the values of the level information are the same as the serial number of the non-zero DCT coefficients. In a real case, it does not have to be in that way, and the level information can range from $-(2^n) \sim 2^n-1$ except zero.

The buffer 120 is preferably, but not limited to, an inverse scan buffer. The inverse scan buffer 120 as shown in FIG. 4B has a plurality of entries 121 for receiving and temporarily storing the received data 104. That is, the entries 121 in the inverse scan buffer 120 record the level information 114 from the variable length decoder 110. An advantage of the present invention is that the inverse scan buffer 120 stores not all the data of all the categories, but the data of less than all the specified categories. In this way, the present invention can reduce the accessing times of the inverse scan buffer 120 in the data access apparatus 100. It will be better understood in the forthcoming specification, and is not thoroughly described here.

A tag table 130, as shown in FIG. 4C, keeps records of corresponding category information, namely zero and/or non-zero information, associated with the data 104. The tag table 130 can merely occupy a limited capacity in the memory of the apparatus 100, and has a plurality of entries 131 for recording zero information 134 and non-zero information 132 of the DCT coefficients. The number of the entries in the tag table is preferably, but not necessarily, the same as the number of DCT coefficients in one DCT block, here for example 64 entries. The zero information 134 of the DCT coefficient is labeled as a first state, namely a digital bit 0, in a corresponding entry in the tag table 130, and the non-zero information 132 of the DCT coefficient is labeled as a second state, namely a digital bit 1, in a corresponding entry in the tag table 130. In order to minimize the memory size of the tag table 130, it is preferred that the zero information 134 of the DCT coefficient is labeled as only one digital bit 0 in the corresponding entry in the tag table 130, and the non-zero information 132 of the DCT coefficient is labeled as only one digital bit 1 in a corresponding entry in the tag table 130. However, more bits can be assigned to the representation of the DCT coefficient in the tag table 130 when there is such a need in the practical application. Moreover, it can, of course, be assigned in the way that the zero information of the DCT coefficient is labeled as one digital bit 1 in the corresponding entry in the tag table 130, and the non-zero information of the DCT coefficient is labeled as only one digital bit 0 in a corresponding entry in the tag table 130. In fact, every time when a new DCT block begins decoding, all the entries in the tag table 130 can be first labeled as one of the aforementioned several states, for example first labeled as digital bit 0. When there is a need to rewrite or re-label the content of a particular entry, the identified entry can then be rewritten or re-labeled from digital bit 0 to digital bit 1. It is worthwhile noted that in the preferred embodiment of the present invention, all the entries in the tag table 130 are better first labeled as digital bit 0, instead of digital bit 1. It is so suggested because, after properly analyzing, it can be found that most of the DCT coefficients in the DCT matrix are zero. It logically follows that the number of the entries recorded with zero information is larger than the number of the entries recorded with non-zero information. Since the zero information of the DCT coefficient is labeled as the digital bit 0, and the non-zero information of the DCT coefficient is labeled as the digital bit 1, it can be reasonably expected that in the tag table 130, the entries labeled as digital bit 0 would outnumber the entries labeled as digital bit 1. Therefore, if all the entries are originally labeled as digital bit 0, the times of re-labeling can be properly reduced in the tag table 130.

The controller 140 controls the data storage process in the inverse scan buffer 120 and the records keeping process in the tag table 130. The controller 140 of the present invention further comprises a first address generator 142 and a second address generator 144. The first address generator 142 receives the run information 112 and generates a tag address 145 and a write address 146. The tag address 145 is the address for rewriting or re-labeling the entries in the tag table 130, so that the zero and/or non-zero information associated with the DCT coefficient can be correctly recorded in the tag table 130. The write address 146 is the address for properly and correctly writing the non-zero DCT coefficient, or namely the level information 114, into the inverse scan buffer 120.

Figure 5A:
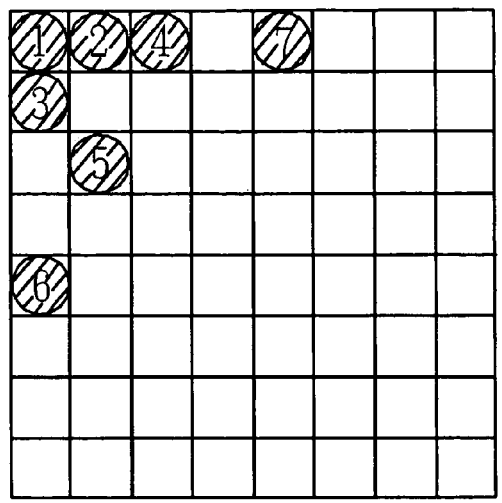
FIG. 5A shows the inverse scan buffer 120 with a plurality of entries for storing the non-zero DCT coefficients in the ordinary positions.
Figure 5B:
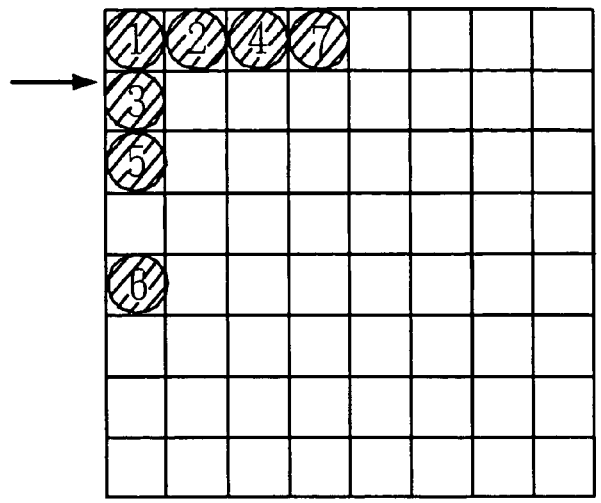
FIG. 5B shows the inverse scan buffer 120 with a plurality of entries for storing the non-zero DCT coefficients after horizontal shift left.
Figure 5C:
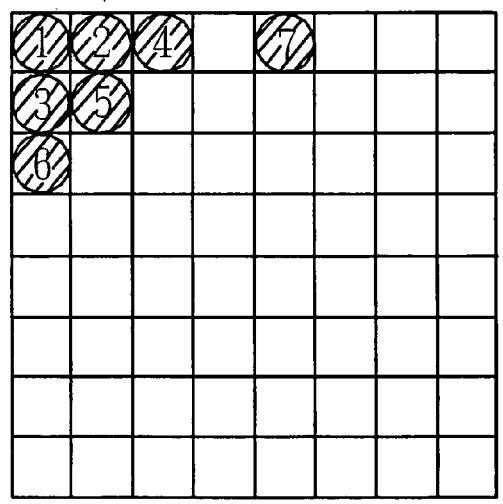
FIG. 5C shows the inverse scan buffer 120 with a plurality of entries for storing the non-zero DCT coefficients after vertical shift up.
Figure 5D:
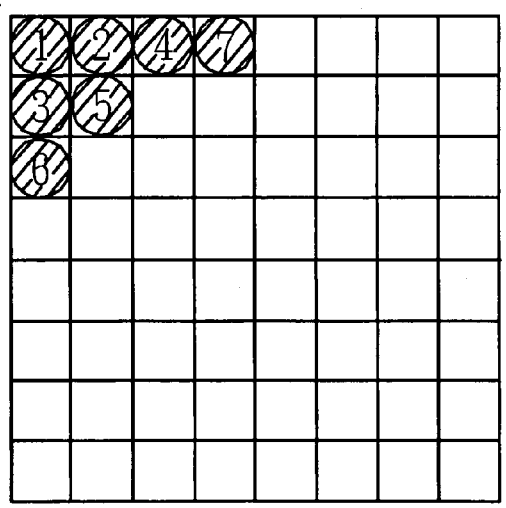
FIG. 5D shows the inverse scan buffer 120 with a plurality of entries for storing the non-zero DCT coefficients after horizontal shift left and vertical shift up.

Please refer to FIG. 5A, FIG. 5B, FIG. 5C, and FIG. 5D. FIG. 5A shows the inverse scan buffer 120 with a plurality of entries for storing the non-zero DCT coefficients in the ordinary positions. FIG. 5B shows the inverse scan buffer 120 with a plurality of entries for storing the non-zero DCT coefficients after horizontal shift left. FIG. 5C shows the inverse scan buffer 120 with a plurality of entries for storing the non-zero DCT coefficients after vertical shift up. FIG. 5D shows the inverse scan buffer 120 with a plurality of entries for storing the non-zero DCT coefficients after horizontal shift left and vertical shift up. In FIG. 5A, the non-zero DCT coefficients are stored in the ordinary positions which correspond to the counterpart positions in the DCT matrix. It can also be understood by referencing FIG. 4A, FIG. 4B. However, it should be noted that the actual position for recording the non-zero DCT coefficient is not so important and critical in the present embodiment. In FIG. 5B, the non-zero DCT coefficients are not stored in the ordinary positions corresponding to the counterpart positions in the DCT matrix, but are horizontally shifted left. In FIG. 5C, the non-zero DCT coefficients are not stored in the ordinary positions corresponding to the counterpart positions in the DCT matrix, but are vertically shifted up. In FIG. 5D, the non-zero DCT coefficients are not stored in the ordinary positions corresponding to the counterpart positions in the DCT matrix, but are horizontally shifted left and vertically shifted up. Different from the prior art, the present invention allows such variant shifts in the inverse scan buffer 120. The actual position for recording the non-zero DCT coefficient is not even important nor critical in the present embodiment. It is so because the tag table 130 is employed in the data access apparatus 100 and can correctly assist the further data read-out process. It is also worthwhile noted that in the prior art, the zero padding is necessary and required to fill the empty entries associated with the zero information of the DCT coefficients left in the inverse scan buffer 120 in order to correctly read out the content in the inverse scan buffer 120 in a later time. However, most important of all, with the aid of the tag table 130 the zero padding is not necessary and not required in the present invention. Therefore, the present apparatus can reduce the accessing times of the inverse scan buffer by the controller in comparison with the prior arts.

The data flow of the present invention can be explained in the following. The variable length decoder 110 first receives the bitstream 102. Then the data decoding process takes place in the variable length decoder 110. After decoding, the run information 112 and the level information 114, such as (0, 1)→(0, 2)→(0, 3)→(2, 4)→(2, 5)→(1, 6)→(3, 7)→EOB, are accordingly generated. The run information 112 is sent to the first address generator 142. The tag address 145 is accordingly generated for rewriting or re-labeling the entries in the tag table 130, so that the zero and/or non-zero information associated with the DCT coefficient can be correctly recorded in the tag table 130. That is, the tag table 130 keeps records of zero and/or non-zero information of the DCT coefficients based on the tag address 145 generated from the first address generator 142. The write address 146 is also generated by the first address generator 142, and is sent to the inverse scan buffer 120 for properly and correctly writing the non-zero DCT coefficient, namely the level information 114, into the inverse scan buffer 120. The inverse scan buffer 120 then stores the level information therein. As explained in the aforementioned paragraph, the actual position for recording the non-zero DCT coefficient in the inverse scan buffer 120 is not so important and critical in the present embodiment.

When the stored data in the inverse scan buffer 120 need to be read out, the second address generator 144 would generate the read address 147. It can also be properly said that the second address generator 144 reads out the level information 114 stored in the inverse scan buffer 120 via the read address 146. The read address 147 is generated by the second address generator 144 according to the information, namely a signal 148, from the tag table 130. The signal 148 contains the information of the tag address 145 and other information necessary for data processing purpose in the next stage circuit, such as the information necessary for generating a quantization coefficient address 149 for inverse quantization purpose. The read address 147 can facilitate and enable the next circuit, for example an inverse quantization circuit 150, to obtain or reconstruct the original zig-zag scan sequence of the zero and non-zero DCT coefficients correctly.

It should be noted that the level information 114 is stored in the inverse scan buffer 120 under the control of the write address 146 of the first address generator 142. No zero padding process in the inverse scan buffer 120 is required in later time after the level information 114 is store therein. The level information 114 will then be further provided to the inverse quantization circuit 150 under the control of the read address 147 of the second address generator 144. In fact, the stored data is further read out under the control of the controller 140 by referencing the corresponding stored category information, the zero tag values 134 and non-zero tag values 132, in the tag table 130. The referencing of the tag table 130 is necessary because not all the incoming data of all the categories, but the data of less than all the specified categories are stored in the inverse scan buffer 120. Therefore, if the data access apparatus 100 wants to output the data in the specified zig-zag scan sequence correctly, the corresponding category information in the tag table 130, such as the information proffered by the signal 148, must be referenced to generate the read address 147 and to further aid the data read-out process. In doing so, the inverse quantization circuit 150 can obtain or reconstruct the original zig-zag scan sequence of the zero and non-zero DCT coefficients.

Figure 6B:
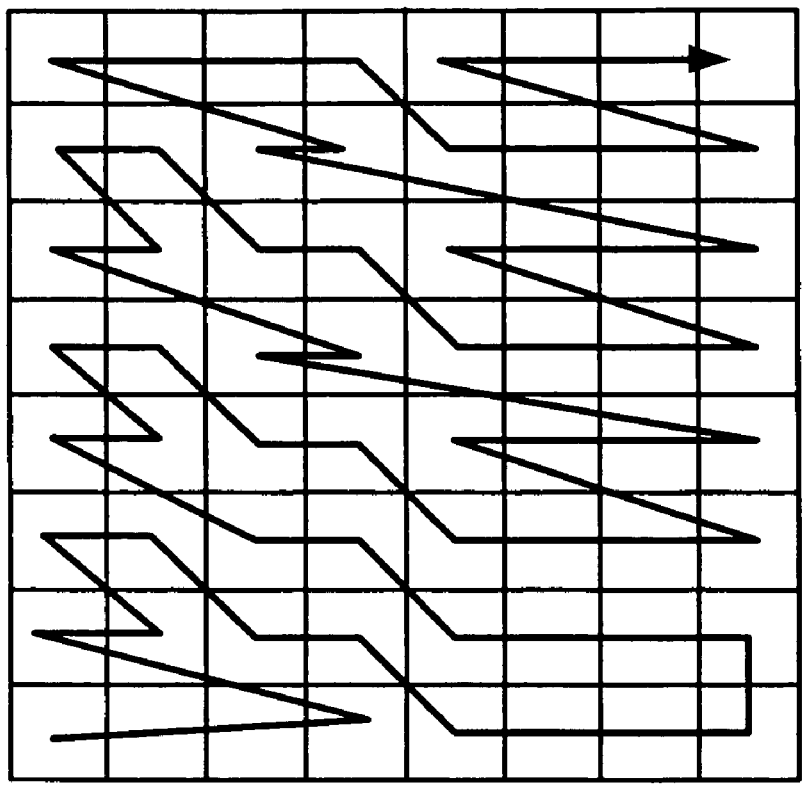
FIG. 6B shows an alternative scan sequence of another embodiment according to the present invention.
Figure 6A:
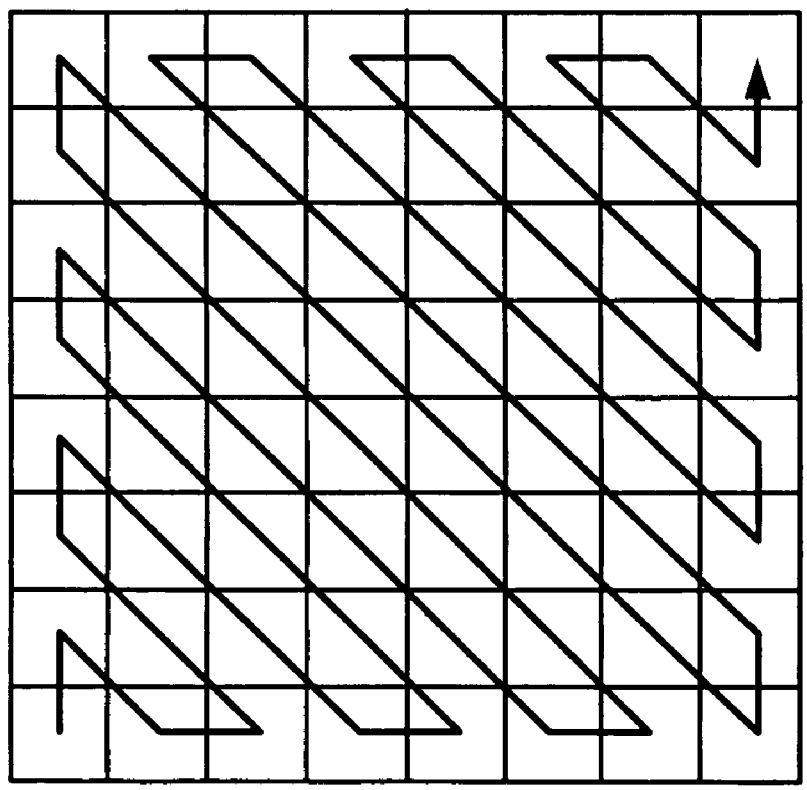
FIG. 6A shows a zig-zag scan sequence of one embodiment according to the present invention.

Please refer to FIG. 6A and FIG. 6B. FIG. 6A shows a zig-zag scan sequence of one embodiment according to the present invention. FIG. 6B shows an alternative scan sequence of another embodiment according to the present invention. The aforementioned specified sequence of the DCT coefficients can also take many forms in different practical applications for fulfill specific design purpose. The zig-zag scan sequence as shown in FIG. 5A and the alternative scan sequence as shown in FIG. 5B are at least two sequences commonly employed by persons skilled in the DCT/IDCT arts. Therefore, no redundancy is made for further explanation of the zig-zag scan sequence or the alternative scan sequence.

The inverse quantization circuit 150 shown in FIG. 3 performs and implements an inverse quantization (IQ) procedure on the non-zero DCT coefficients from the inverse scan buffer 120. According to the quantization coefficient address 149 from the second address generator 144, a corresponding individual quantization coefficient for the current non-zero DCT coefficient can be selected and used for the inverse quantization (IQ) procedure. The inverse quantization circuit 150 shown in FIG. 3 is just an example among the many choices which a next stage circuit can be. The next stage circuit can be an inverse quantization circuit 150 as shown in FIG. 3. The next stage circuit can be an IDCT circuit for implementing an inverse discrete cosine transform (IDCT) procedure. The next stage circuit can be an interpolation circuit for implementing data interpolation procedure. The next stage circuit can also be any combination of the aforementioned circuits depending on different practical applications.

In addition to the aforementioned circuits, the apparatus of the present invention can also be further electrically coupled to an image decoder and/or an image encoder 160, such as those employed in the digital still camera. The image decoder and/or the image encoder 160 function as generating the DCT data and/or performing IDCT procedure. The apparatus of the present invention can also be further electrically coupled to a video decoder and/or a video encoder 170, such as those employed in the digital video (DV) system. The video decoder and/or the video encoder 170 also function as generating the DCT data and/or performing IDCT procedure. The detailed implementation associated with the DCT/IDCT procedure is well known in the DCT/IDCT arts. No redundancy is made for further explanation.

Figure 7:
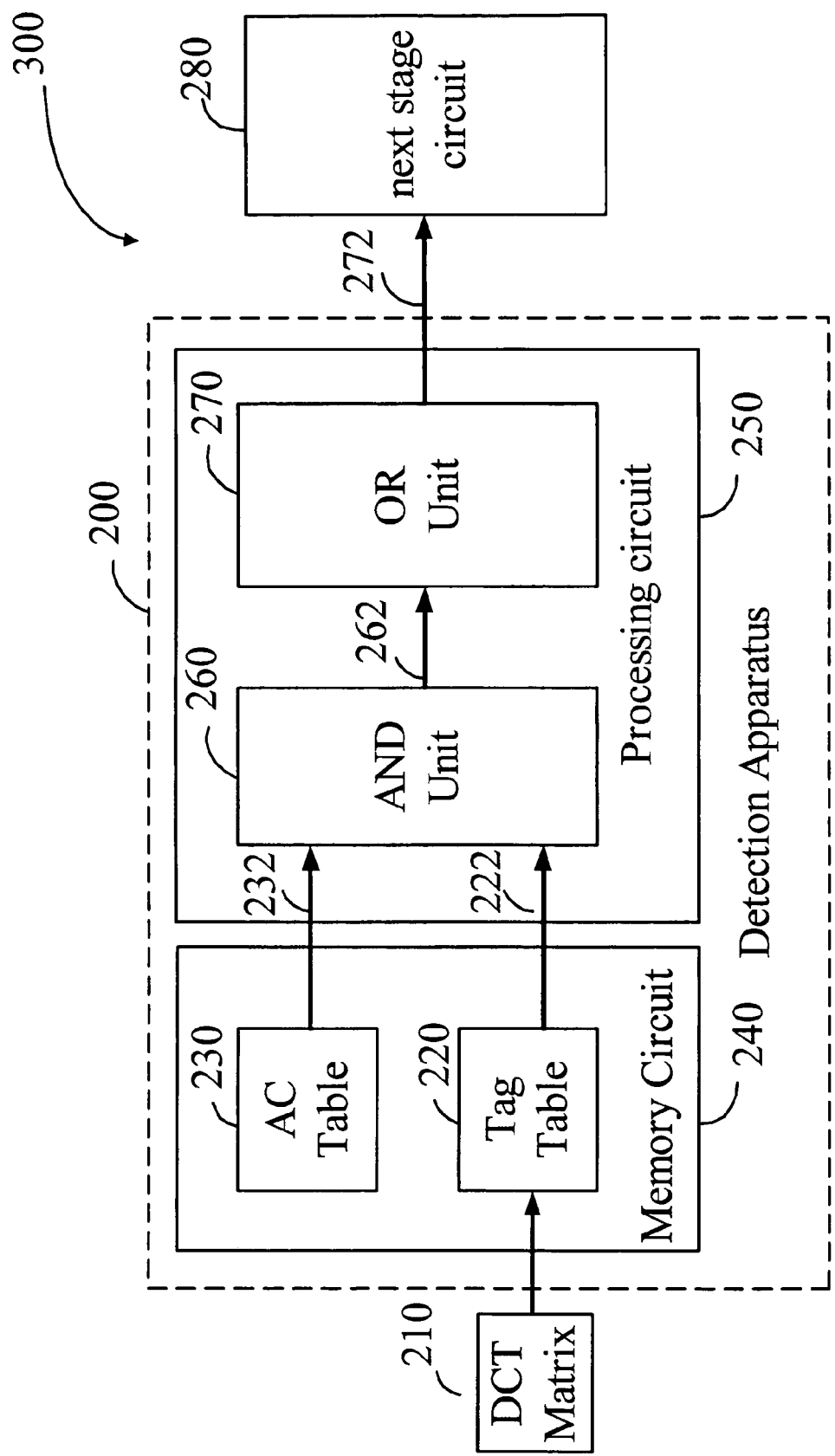
FIG. 7 shows the block diagram of apparatus for AC coefficient detection in a digital data processing system.
Figure 8A:
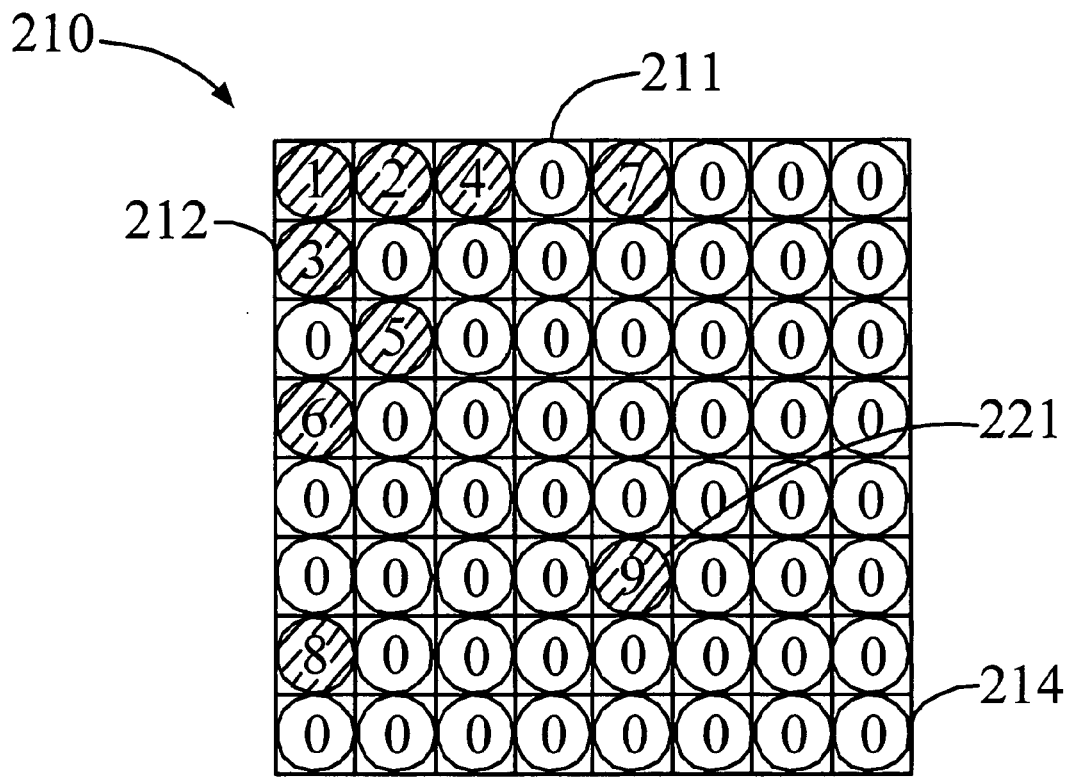
FIG. 8A shows the DCT matrix with a plurality of DCT coefficients.
Figure 8B:
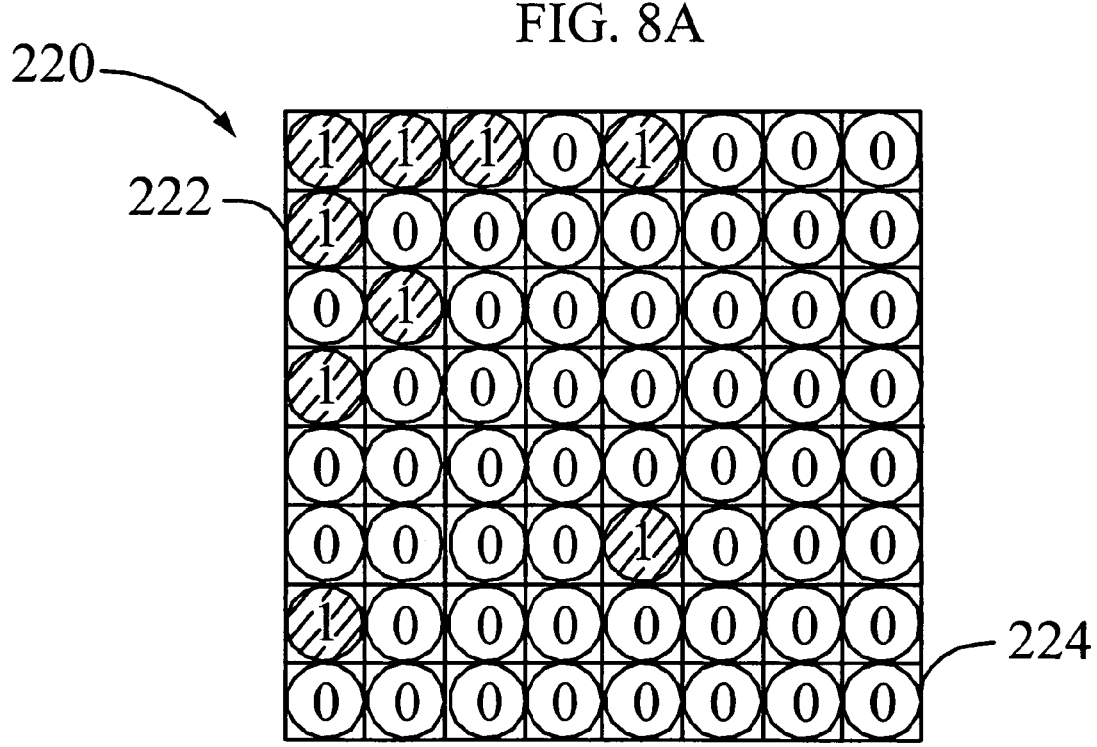
FIG. 8B shows the tag table with a plurality of tag values.
Figure 9A:
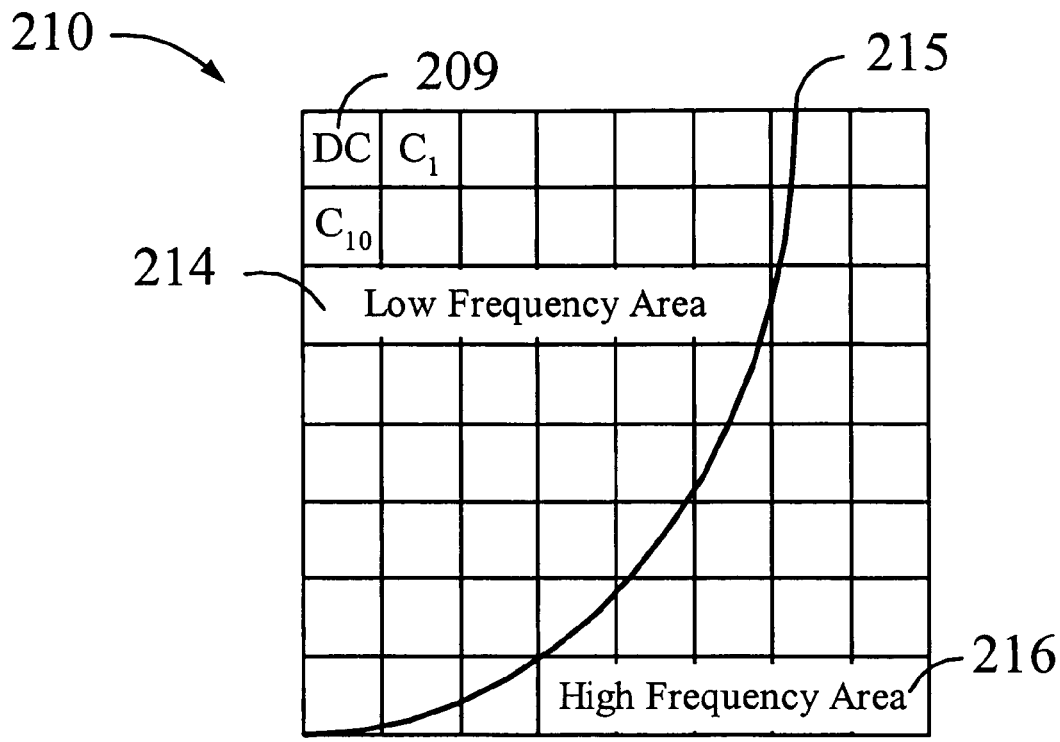
FIG. 9A shows the DCT matrix divided by a curve, and a low frequency area and a high frequency area thus rendered.
Figure 9B:
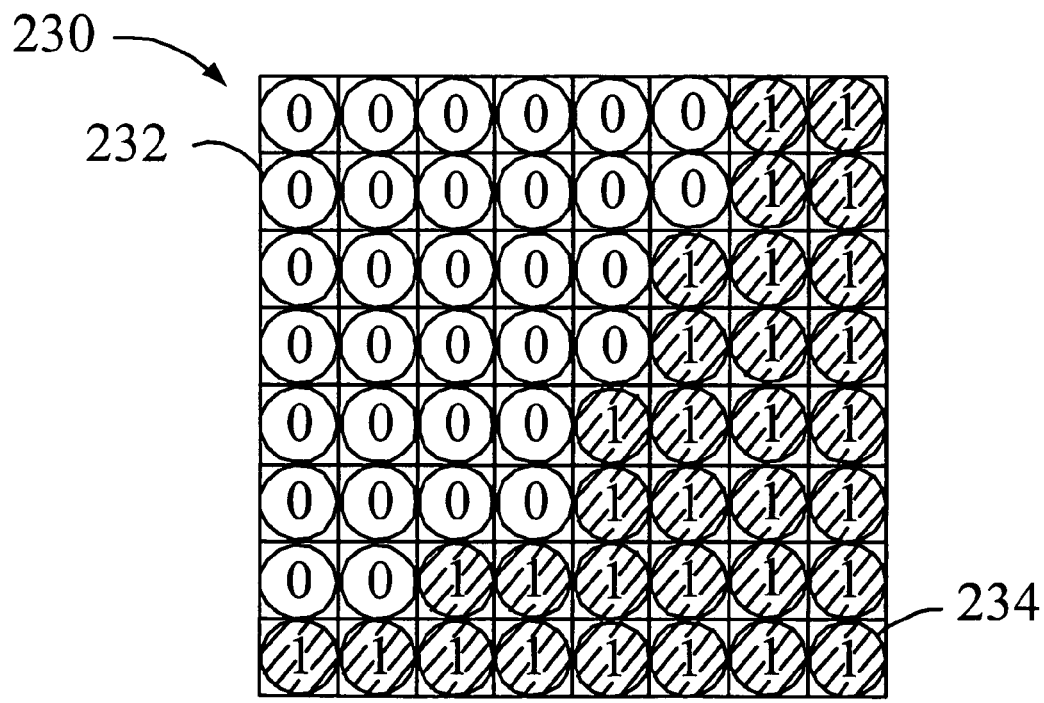
FIG. 9B shows the AC table with a plurality of predetermined AC state values.
Figure 10A:
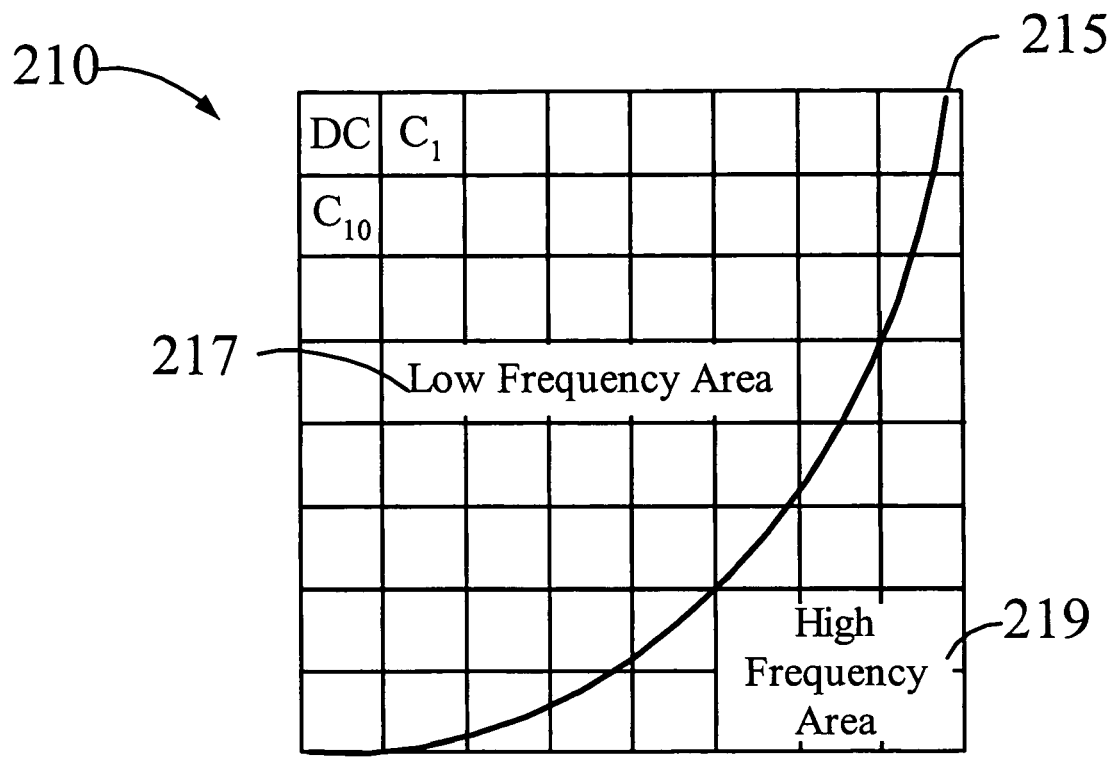
FIG. 10A shows the DCT matrix divided by a curve, and a low frequency area and a high frequency area thus rendered.
Figure 10B:
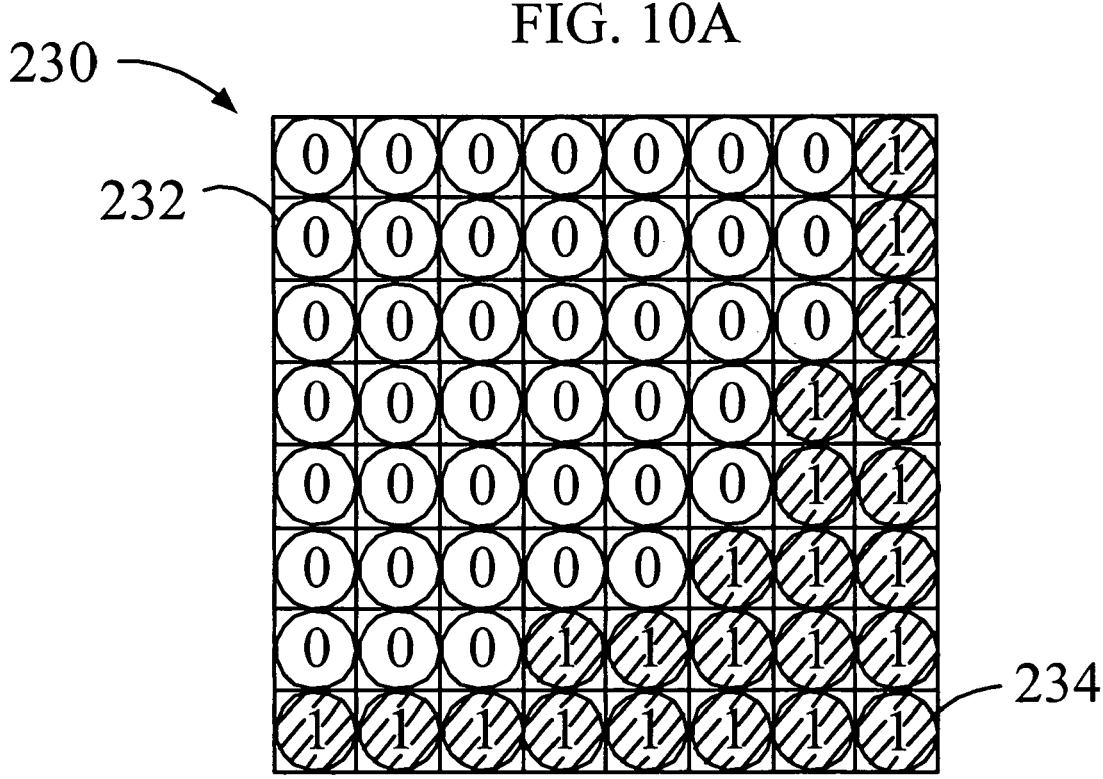
FIG. 10B shows the AC table with a plurality of predetermined AC state values.

Please refer to FIG. 7, FIG. 8A, FIG. 8B, FIG. 9A, FIG. 9B, FIG. 10A, and FIG. 10B. FIG. 7 shows the block diagram of apparatus 200 for AC coefficient detection in a digital data processing system 300. FIG. 8A shows the DCT matrix 210 with a plurality of DCT coefficients 211. FIG. 8B shows the tag table 220 with a plurality of tag values 222. FIG. 9A shows the DCT matrix 210 divided by line 215, and a low frequency area 214 and a high frequency area 216 thus rendered. FIG. 9B shows the AC table 230 with a plurality of predetermined AC state values 232, 234. FIG. 10A shows the DCT matrix 210 divided by line 215, and a low frequency area 217 and a high frequency area 219 thus rendered. FIG. 10B shows the AC table 230 with a plurality of predetermined AC state values 232, 234.

The detection apparatus 200 is another embodiment according to the present invention to utilize the tag table for its specific design purpose. The detection apparatus 200 can fast detect AC coefficients in the incoming discrete cosine transform (DCT) matrix 210 or DCT block with the aid of a tag table 220 and an AC table 230. The detection apparatus 200 can be accommodated in a digital data processing system 300 for implementing an inverse discrete cosine transform (IDCT) by receiving the incoming DCT matrix 210, namely the DCT blocks. In a typical DCT block 210, for example 8×8 DCT block as shown in FIG. 9A, there are 64 entries for 64 DCT coefficients. In the 8×8 DCT block, the upper-left entry is DC value 209 among the DCT coefficients, and the rest are usually categorized as AC frequency entries. Furthermore, the AC frequency entries near the DC value are usually categorized as low frequency entries or a low frequency area 214. In contrast, the AC frequency entries near the lower-right part are usually categorized as high frequency entries or a high frequency area 216. In FIG. 9A, the low frequency area 214 and the high frequency area 216 are defined by the line 215. However, it should be noted that the low frequency area 214 and the high frequency area 216 are only relative concepts, and can be redefined by redrawing the line 215. For example, after redrawing the line 215, a new low frequency area 217 and a new high frequency area 219 are rendered.

The detection apparatus 200 comprises a tag table 220, an AC table 230, a memory circuit 240 and a processing circuit 250. The tag table 220 and the AC table 230 are preferably, but not limited to, stored in the memory circuit 240.

The tag table 220 includes a plurality of tag values 222 corresponding to a plurality of DCT coefficients 211 in the incoming DCT matrix 210. The AC table 230 includes a plurality of correspondingly predetermined AC state values with at least two distinct states 236 and 238, or even more states. Each AC state value is assigned to only one of the at least two distinct states. The processing circuit 250 receives the tag values 222 and the AC state values 236 or 238 respectively from the tag table 220 and the AC table 230, and then performs data processing thereon. The main function of the processing circuit 250 is assigned to, but not limited to, compare the corresponding pair of the tag value and the AC state value to determine whether any DCT coefficient of a particular state exists in the DCT incoming matrix 210.

For detailed explanation for the tag table 220, it is associated with the DCT coefficients 211 in the incoming DCT matrix 210. The DCT coefficients 211 in the incoming DCT matrix 210 include at least two mutually exclusive sets of coefficients 222 and 224. All the DCT coefficients in the same set are assigned to the same tag values whereas the DCT coefficients in different sets are assigned to different tag values. For example, the DCT coefficients 211 in the incoming DCT matrix 210 usually include zero 214 and/or non-zero 212 coefficients, which constitute two mutually exclusive sets of coefficients. If one DCT coefficient, for example DCT coefficient 212, is non-zero, the corresponding tag value 222 is assigned to one digital bit 1. If one DCT coefficient, for example DCT coefficient 214, is zero, the corresponding tag value 224 is assigned to one digital bit 0. It is also noticed that persons skilled in the art would know that the zero DCT coefficient is not necessarily assigned by the digital bit 0, and the non-zero DCT coefficient is not necessarily assigned by the digital bit 1. The assignments can also be exchanged. Namely, it can also be assigned in the tag table that the zero DCT coefficient is assigned by the digital bit 1, and the non-zero DCT coefficient is assigned by the digital bit 0 respectively.

For detailed explanation for the AC table 230, it is utilized to define distinct states for our detection purpose. For example, the AC table 230 according to the present invention is shown in FIG. 9B, and can include two distinct states 232 and 234. One is a low frequency state represented by a digital bit 0, and the other is a high frequency state represented by a digital bit 1 respectively. In fact, the AC table can be utilized to define different definitions of a high frequency area and a low frequency area according to different practical applications. That is, the high frequency area of the incoming matrix specified by the AC table is subject to be dynamically changed. This can be done by re-assigning the current state of at least one AC state value in the AC table to a different state. According to the designer's specific design purpose, just as shown in FIGS. 9A and 10A, the line 215 can be redrawn. When the line is redrawn, it is equivalent to the re-assignment of the current states of the AC state values in the AC table, as shown in FIGS. 9B and 10B. It is also noticed that persons skilled in the art would know that the low frequency state is not necessarily represented by the digital bit 0, and the high frequency state is not necessarily represented by the digital bit 1. The assignments can also be exchanged. Namely, it can also be arranged in the AC table that the low frequency state is represented by the digital bit 1, and the high frequency state represented by the digital bit 0 respectively.

As shown in FIG. 7, the processing circuit 250 of the detection apparatus 200 comprises an AND unit 260 and an OR unit 270. The AND unit may comprise one or more AND gates to perform a logical AND operation on each pair of the corresponding AC state value 232 and the tag value 222, and then generate a corresponding AND result 262. The OR unit may comprise one or more OR gates to perform a logical OR operation on all of the generated AND results 262, and then generate a corresponding OR result 272. The OR result 272 generated by the processing circuit 250 is indicative for determining whether any DCT coefficient of a particular state exists in the incoming DCT matrix. For example, the ninth non-zero DCT coefficient 221 would be detected by the detection apparatus 200 as located in the high frequency area 216 with the aid of the AC table defined in FIG. 9B. However, the same ninth non-zero DCT coefficient 221 would not be detected out by the detection apparatus 200 as located in the high frequency area 219 with the aid of the AC table 230 defined in FIG. 10B because under the definition of the AC table 230 in FIG. 10B, the ninth non-zero DCT coefficient 221 is located in the low frequency area 217.

It should be noted that the AND unit 260 does not necessarily precede the OR unit 270. The order of the AND unit 260 and the OR unit 270 can be reversed. Only minor circuit amendment should be made in order to enable such a circuit configuration. No redundancy is made for further explanation in such circuit configuration.

The result 272 can then be provided to a next stage circuit for various design purpose and utility. For example, if the outcome with a positive result is confirmed, it usually indicates that there might exist some edges in the target image by the fact that a high frequency DCT coefficient is detected in the incoming DCT matrix or block. If such a situation is confirmed, the result can be used to trigger some applications of image quality improvement in the next stage circuit. The next stage circuit can be an IDCT circuit for implementing an inverse discrete cosine transform (IDCT) procedure. It can also be an inverse quantization circuit for implementing an inverse quantization (IQ) procedure. It can also be an interpolation circuit for implementing data interpolation procedure. It can also be any combination of the aforementioned circuits. The apparatus of the present invention can be further electrically coupled to an image decoder and/or an image encoder, such as those employed in the digital still camera. The image decoder and the image encoder function as generating the DCT data and/or performing IDCT procedure. The apparatus of the present invention can also be further electrically coupled to a video decoder and/or a video encoder, such as those employed in the digital video (DV) system. The video decoder and the video encoder also function as generating the DCT data and/or performing IDCT procedure. The detailed implementation associated with the DCT/IDCT procedure is well known in the DCT/IDCT arts. No redundancy is made for further explanation.

The advantages of the present invention can be summarized as follows:

1. The tag table 130 uses only a limited memory capacity. The apparatus 100 according to the present invention pays the cost to include the tag table 130 additionally. However, it avoids the zero padding process in the prior art. Therefore, a larger memory capacity requirement for the inverse buffer 16 in the prior art is not necessary. It would dramatically release the burden of the memory capacity requirement. It would also shorten the data processing time for the apparatus in overall.
2. Because the level information is written into the inverse scan buffer without performing zero padding to fill other empty entries not recorded the level information, no zero information of the DCT coefficients is required to be read out from the inverse scan buffer. It follows that the present apparatus thus reduces the accessing times of the inverse scan buffer by the controller in comparison with the prior arts.
3. With the aid of the tag table 130, time to perform zero padding can be saved. Unnecessary data processing time, for example the time spent to process the zero DCT coefficients, can accordingly be saved, too.
4. The present invention also provides a fast way to assist the determination whether any high frequency DCT coefficient exits in the DCT block with the aid of a tag table 220 and an AC table 230. The tag table 220 uses the tag values 222 and/or 224 to contain the necessary but minimized set or category information associated with the DCT coefficients 211 of the incoming DCT matrix 210. The AC table 230 uses the AC state values to define distinct states for the high frequency coefficient detection purpose. The high or low frequency area (or more distinct areas) in the AC table 230 can be defined by the designer to fulfill its design purpose. The definition delineating those areas can also be changed or modified by the designer to fulfill its design purpose. The detection process according to the present invention is fast and simple. The detection result can thus be provided to a next stage circuit for further decision-making. For example, whether an edge exists in the corresponding image associated with the DCT matrix.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An apparatus for AC coefficient detection in a digital data processing system, the apparatus comprising:
    a tag table including a plurality of tag values corresponding to a plurality of DCT coefficients in an incoming matrix;
    an AC table including a plurality of correspondingly predetermined AC state values with at least two distinct states, wherein each AC state value is assigned to only one of the at least two distinct states; and
    a processing circuit for receiving the tag and AC state values respectively from the tag table and the AC table, and performing data processing thereon;
    wherein, the processing circuit compares the corresponding pair of the tag and AC state values to determine whether any DCT coefficient of a particular state exists in the incoming matrix.

2. The apparatus of claim 1, wherein the DCT coefficients in the incoming matrix include at least two mutually exclusive sets of coefficients, and wherein all the DCT coefficients in the same set are assigned the same tag values whereas DCT coefficients in different sets are assigned different tag values.

3. The apparatus of claim 1, wherein the DCT coefficients in the incoming matrix include zero and/or non-zero coefficients, and wherein if one DCT coefficient is non-zero, the corresponding tag value is assigned one digital bit 1, and if one DCT coefficient is zero, the corresponding tag value is assigned one digital bit 0.

4. The apparatus of claim 1, wherein the AC table includes two distinct states, one is a low frequency state represented by a digital bit 0 or 1, and the other is a high frequency state represented by a digital bit 1 or 0 respectively.

5. The apparatus of claim 1, wherein a high frequency area of one incoming matrix specified by the AC table is subject to be dynamically changed by re-assigning the current state of at least one AC state value in the AC table to a different state.

6. The apparatus of claim 1, wherein the processing circuit comprises:
    an AND unit for performing a logical AND operation on each pair of the corresponding AC and tag values and generating a corresponding AND result; and
    an OR unit for performing a logical OR operation on all of the generated AND results and generating a corresponding OR result;
    wherein, the OR result generated by the processing circuit is indicative for determining whether any DCT coefficient of a particular state exists in the incoming matrix, and is then provided to a next stage circuit for image quality improvement.

7. The apparatus of claim 6, wherein the next stage circuit is one of the following circuits: an IDCT circuit for implementing an inverse discrete cosine transform (IDCT) procedure, an inverse quantization circuit for implementing an inverse quantization (IQ) procedure, an interpolation circuit for implementing data interpolation procedure, or any combination of the aforementioned circuits.

8. The apparatus of claim 1, wherein the apparatus is further electrically coupled to an image/video decoder and/or an image/video encoder which generate the DCT data and/or perform IDCT procedure.

9. A method for implementing a discrete cosine transform/inverse discrete cosine transform (DCT/IDCT) to thereby construct a video/image in a video/image processing system, the method comprising the following steps of:

utilizing a tag table to record a plurality of tag values corresponding to a plurality of DCT coefficients in an incoming matrix;

utilizing an AC table to record a plurality of predetermined AC state values corresponding to at least two distinct states, wherein each AC state value is assigned to only one of the at least two distinct states;

utilizing a processing circuit to process the video/image with the tag and AC state values respectively received from the tag table and the AC table; and utilizing the processing circuit to compare the corresponding pair of the tag and AC state values to determine whether any DCT coefficient of a particular state exists in the incoming matrix.

10. The method of claim 9, wherein the DCT coefficients in the incoming matrix include at least two mutually exclusive sets of coefficients, and wherein all the DCT coefficients in the same set are assigned to the same tag values whereas DCT coefficients in different sets are assigned to different tag values.

11. The method of claim 9, wherein the DCT coefficients in the incoming matrix include zero and/or non-zero coefficients, and wherein if one DCT coefficient is non-zero, the corresponding tag value is assigned to one digital bit 1, and if one DCT coefficient is zero, the corresponding tag value is assigned to one digital bit 0.

12. The method of claim 9, wherein the AC table includes two distinct states, one is a low frequency state represented by a digital bit 0 or 1, and the other is a high frequency state represented by a digital bit 1 or 0 respectively.

13. The method of claim 9, wherein a high frequency area of one incoming matrix specified by the AC table is subject to be dynamically changed by re-assigning the current state of at least one AC state value in the AC table to a different state.

14. The method of claim 9, wherein the method further comprises:

utilizing an AND unit to perform a logical AND operation on each pair of the corresponding AC and tag values and generating a corresponding AND result; and utilizing an OR unit to perform a logical OR operation on all of the generated AND results and generating a corresponding OR result;

wherein, the generated OR result is indicative for determining whether any DCT coefficient of a particular state exists in the incoming matrix, and is then provided to a next stage circuit for image/video quality improvement.

* * * * *

UNITED STATES PATENT AND TRADEMARK OFFICE
CERTIFICATE OF CORRECTION

| | | |
|---|---|---|
| PATENT NO. | : 7,587,093 B2 | Page 1 of 1 |
| APPLICATION NO. | : 10/887375 | |
| DATED | : September 8, 2009 | |
| INVENTOR(S) | : Lee | |

It is certified that error appears in the above-identified patent and that said Letters Patent is hereby corrected as shown below:

Column 1, Background of the Invention, Line 31, after the word "coefficient", -- a new paragraph should begin.

Column 4, Brief Description of the Appended Drawings, Line 25, after the word "art", -- a new paragraph should begin.

Column 5, Detailed Description of the Invention, Line 1, after the word "Fig.", insert -- 4C --.

Signed and Sealed this

Seventeenth Day of November, 2009

David J. Kappos
*Director of the United States Patent and Trademark Office*